United States Patent [19]
Wust

[11] 3,839,617

[45] Oct. 1, 1974

[54] ELECTRODE-HEAD FOR WELDING APPARATUS FOR CHAIN-LINKS

[75] Inventor: Toni Wust, Cologne, Germany

[73] Assignee: Meyer, Roth & Pastor Maschinenfabrik GmbH, Cologne, Germany

[22] Filed: Mar. 15, 1973

[21] Appl. No.: 341,686

[52] U.S. Cl. .................................................. 219/51
[51] Int. Cl. ......................... B21l 3/02, H05b 1/00
[58] Field of Search ................................ 219/51, 52

[56] References Cited
UNITED STATES PATENTS
1,463,714  7/1923  Mueller ................................ 219/51
1,975,753  10/1934  Delano et al. .................... 219/52 X Primary Examiner—J. V. Truhe
Assistant Examiner—Hugh D. Jaeger
Attorney, Agent, or Firm—Holman & Stern

[57] ABSTRACT

An electrode-head for chain links welding apparatus in which means are provided for simultaneously moving a pair of gripping arms through a compound moment relative to a chain-link being welded whereby minimum wear on the welding apparatus electrodes occurs and maximum contact and welding current is provided at the links being welded.

12 Claims, 7 Drawing Figures

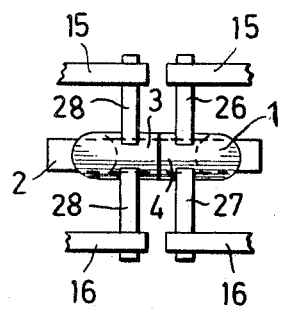
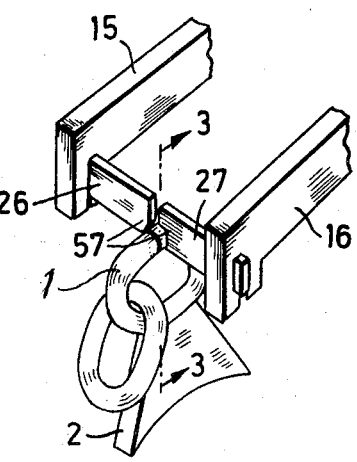
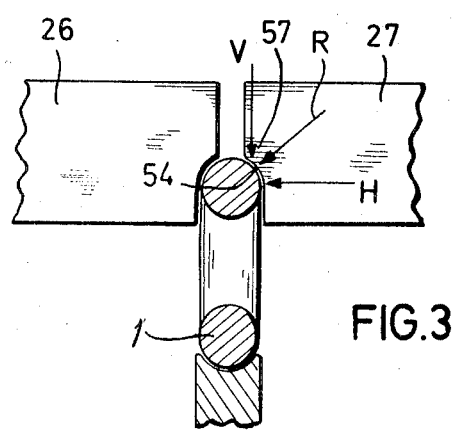

ELECTRODE-HEAD FOR WELDING APPARATUS FOR CHAIN-LINKS

BACKGROUND OF THE INVENTION

1. Field of the Invention

The instant invention concerns an electrode head apparatus for chain-link welding machines which are provided with two gripping arms for each pair of electrodes and wherein the gripping arms are oriented to an optimum position by means of a gripping arrangement.

2. Description of the Prior Art

In a prior art arrangement of this type (German Patent No. 1,022,884), the gripping means is formed by a hydraulic cylinder which is arranged between the ends of the forked gripping arms. This whole device is liftable from the area where the chain-link is welded by means of a lifting device and may be lowered into an operational position by the same device, in which the pressure-cylinder closes the gripping arm and places the pair of electrodes at both sides on the link-end; an identical arrangement is proposed for the adjacent link-end.

SUMMARY OF THE INVENTION

The instant invention is based on the recognition that during the pressing of the electrodes against the side-areas of the link-ends, the power transmission is unfavorable and the heating time is therewith very extensive since the electrode contact areas must be oriented very precisely and after continuous use will be subjected to wear at the ends of their peripheral area over which they contact the links, so that the actual contact area may be substantially reduced.

Premature wear can result from unevenness in the diameter of the wire being welded, from deviations in the precise positioning of the links on the seat and between the upsetting dies. If the electrodes press from the sides, then the peripheral ends of the contact areas of the electrodes force the ends of the link into the correct position and the friction developed between the parts results in the excessive wear. To this is added the disadvantage that in the prior art, not only the electrode-areas must be oriented precisely in relation to the wire-diameter, but, the two electrodes comprising a pair must also be oriented precisely and be adjusted with respect to each other, and this is changed by the unequal wear. Also, in this regard, as the wear of the electrode areas increases, the effective contact-area between electrodes and chain-link ends is continuously reduced.

The instant invention is therefore directed to the problem of removing these disadvantages and to provide means whereby the contact area between the electrodes and the link-ends is maintained at a maximum and is protected from wear.

In accordance with the instant invention, the electrodes are not only positioned laterally of the links being welded, but diagonally from the outside so that in addition to the lateral pressure force of the prior art electrodes there is added a pressure component which is effective from opposite sides from the the outside into the linkplane. It is clear that this will permit electrodes of a different form since they are not only placed in contact with the link from the sides, but contact the link diagonally from the top. Surprisingly, it has been shown that the electric contact area of the electrodes, over a period of time, increases due to the low wear, even though the peripheral angle of the contact areas is reduced due to the change of the pressure direction of the electrodes on the link, namely, it extends in general up to about 90° for each electrode.

Accordingly, the instant invention consists in that an additional pressure means, or example a pressure cylinder, is provided on an electrode-welding head for chain-links of the type with gripper arms and a stress-device for the lateral moving-together of these gripper arms, whereby said additional pressure means, together with a lifting-device for the lowering and lifting of the electrodes before or after the welding process, moves into the direction of this lifting- and lowering-device. It is thereby clear that the electrode-contact-areas on the sides of the link are altered accordingly and it is recommended that the force of the pressure-device be adjusted so that the resultant forces applied due to the gripping force and the pressure force penetrate at about below 45° to the horizontal through the cross section of the link at the point of welding.

A simplification of this device is obtained by utilizing the pressure-cylinder of the invention simultaneously as a lifting-cylinder so that no additional means is required. In place of a pressure cylinder, one may also utilize any suitable mechanical pressure-means so that a cam-plate of the prior art, which affects a lifting-lever by means of an intermediate member, may be retained in the scope of the instant invention, probably amount of pressure.

In view of the costs and number of electrodes required, an objective of the invention is to reduce the impact of the electrodes engaging the link-ends; it is furthermore proposed that the impact with the links be adjusted in a manner so that the link-ends are positioned at a predetermined height in relation to the form of a finished link. Shortly before the impact of the gripping arms on the links, preferably resilient impacts are proposed which, for the purpose of rapid production, i.e., a high work-performance of the apparatus, decelerate the electrode-head. Subsequently, the additional impacts should then extended so that the pressure-supply to the link-ends, and their deformation, comprises firm impact, whereby the link-ends are brought positively to a prescribed height. Also, it is not possible with the prior art electrodes, which are only laterally clamped together, and is only possible by means of the pressure imposed by the invention applied in the direction of the lifting. The additional impacts may be produced by hydraulic cylinders which provide a certain resiliency during the contact of the gripping arms on the links being welded which, simultaneously with the pressure supply, are made pressureless, i.e., yield in the direction of the pressure.

By means of the invention, wear is prevented on the electrodes of prior art embodiments, and, this results from the fact that the electrodes are not completely adjusted relative to each other, or the adjustment is no longer effective due to the wear occurring on the electrodes. An adjustment during operation is not possible, and stopping of the apparatus is undesirable.

This disadvantage may be eliminated through the use of the inventive pressure-cylinder etc., in that the pressure cylinder includes a rocker, whose ends contact the gripping arms which are guided indepedent of each other in the lifting direction. In this manner, pressure is evenly distributed to the two gripping arms, whereby they are able to adjust themselves, however, without concern for any deviations in the cross section of the wire of worn conditions of the electrodes.

The rocker may also be replaced by other suitable means, thus, for example, by a special piston operatively connected to each gripping arm.

The above-mentioned disadvantages of an unequal arrangement of electrodes consists, however, not only with respect to the height of the link, but also with respect to the lateral position of the link-ends before contacted by the electrodes. Due to the oblique position and resulting pressure-force on the electrodes, it is possible to provide a centering device having a lifting means for the gripping arm opposite the center-plane of the member. For example, a double-armed/equal-armed lever can be arranged in the center-plane of the link and parallel to the lifting-direction, whereby its ends are connected with cardanically positioned gripping arms by means of joints. The centering insures that link-ends, which under certain conditions are not in precise alignment with each other, are now pressed into a desired or optimum position by the electrodes without causing excessive wear on the contact-areas of the electrodes; these contact area in general are above the horizontal diameter of the wire and the electrode areas run generally tangential or perpendicular to the lateral area of the horizontal cross-sectional diameter of the wire.

Another improvement of the electrode-head consists in the cardanical joint areas of the gripping arms being adjustable in the direction of the longitudinal axis of the link. Also, such an adjustment will improve the power transmission and concentrate the applied current to the outermost chain-link ends. This is best effected by utilizing an adjustment-axle which runs perpendicular to the center-plane of the link and the ends of which are cardanically connected with the gripping arms so that during forward-sliding of one gripping arm, the other gripping arm moves back simultaneously; by means of only one adjustment both arm ends are equalized in length. An additional delivery means can be provided which contacts at the center of this adjustment-axis and moves this, together with the gripping arms, to the welding point to provide complete adjustability.

Finally, a spatial rotation of the contact areas of the electrodes during the lifting and contacting of the electrodes has proven effective, which, according to the instant invention, may be obtained by means whereby the gripping arms are positioned parallel to the longitudinal axis of the link, i.e., they are horizontally positioned and are not — as in prior art devices — perpendicular, whereby the rocker axle of the rocker, by means of which both arms are connected to each other, form a triangle with the joint-points of the gripping arm and the contact areas of the electrodes in side elevation. The rocking axle is positioned in the lifting-direction away from the chain-link. In this manner, the gripping arms are tilted upwardly by the cardanical end-joint-points during the lifting of the electrodes; they are, however, simultaneously expanded, whereby the expansion movement of each gripping arm is effected between its end-point and its rocking-axle joint.

These, together with other objects and advantages, will become apparent from the following description of exemplary embodiments when taken with the drawings forming a part thereof, wherein:

BRIEF DESCRIPTION OF THE DRAWINGS

FIG. 1 represents fragmentary a top plan view of a chain link engaged by welding electrodes;

FIG. 2 is a fragmentary perspective view of a chain-link to be welded resting on a support, with two electrodes applied;

FIG. 3 is a fragmentary section substantially on the plane of line 3—3 of the electrodes taken on FIG. 2;

DESCRIPTION OF PREFERRED EMBODIMENTS

Figure 4:
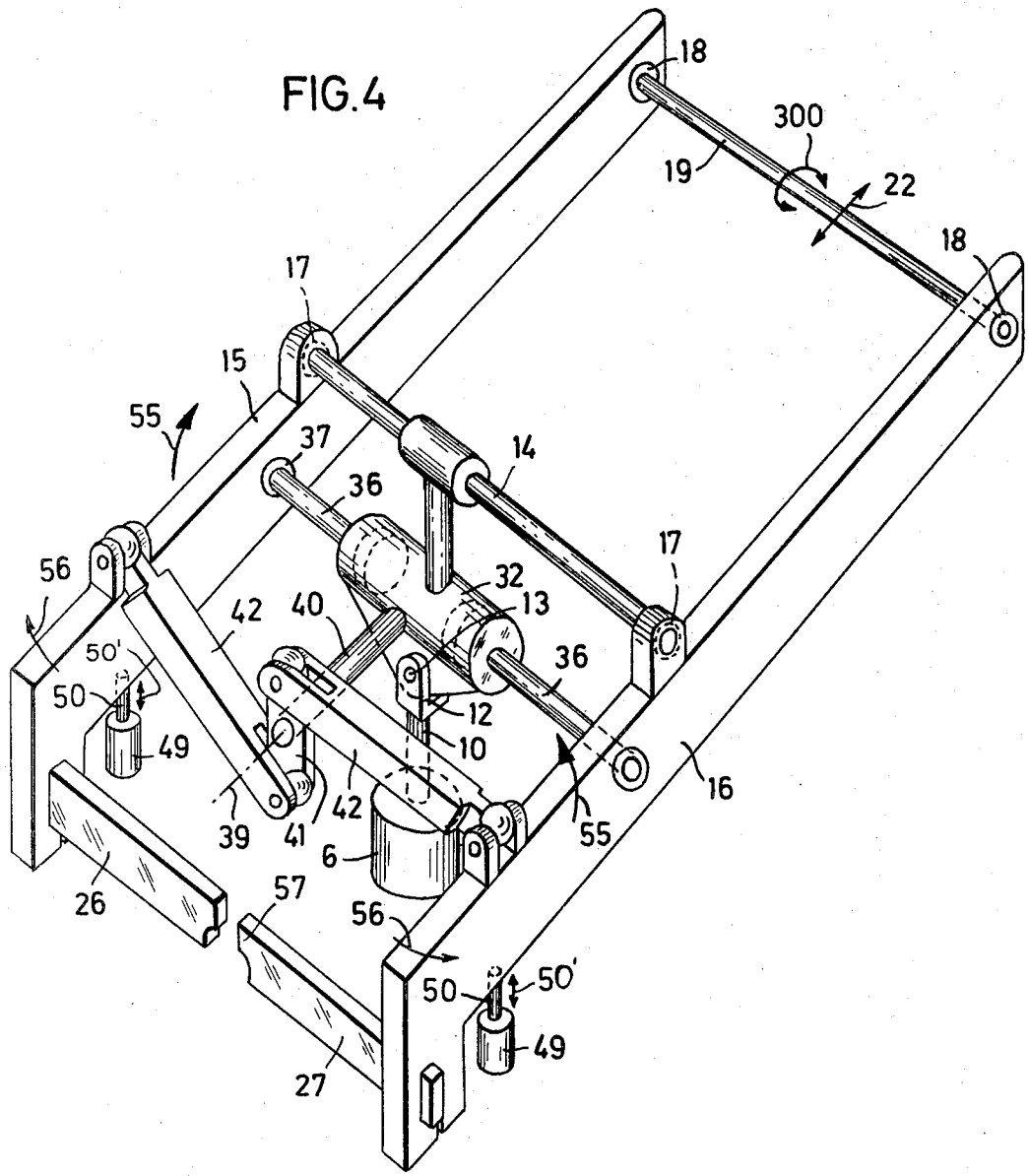
FIG. 4 is a relatively diagrammatic, perspective view of one electrode-head assembly.

Referring to FIGS. 1 and 2, a chain-link 1 to be welded rests on a seat or support 2 and electrode pairs 26, 27 or 28, 28 engage at opposite sides of link-ends 3 and 4, and a welding current will pass through the electrode pairs; welding is accomplished in such a manner so that the one pole of a transformer (not shown) is connected to electrodes 26 and 27 engaging link-end 2, while the other pole of the transformers connects to electrodes 28, 28 which rest on the other end 4 of the link.

The electrodes 26, 27 are described below in more detail and in connection with the complete electrode head, as will electrodes 28.

The electrodes 26, 27 and 28, 28 as shown in FIG. 2, are arranged on gripper arms 15, 16 which are controlled in the prior art device, and for the purpose of swinging the electrodes out from the closed position shown in FIGS. 1 and 2, where the electrodes contact the link-ends, they are first spread outwardly and then lifted upwardly. In the prior art device, the electrodes generally cover the link-cross-section shown in FIG. 3 at a surrounding angle of nearly 120°. This contact area of about 120°, as well as the spreading- and lifting-movement, make it necessary on one hand to precisely adjust the contact area of each electrode to the diameter of the wire. Since, however, the wire diameter generally varies within certain tolerances in spite of the large angle of coverage of each electrode, they contact only on two lines on the link-ends so that the current-flow is unsatisfactory and the electrodes generally are subjected to wear at the contact areas. To this is added that the dimensions of the links which vary in themselves so that the link-ends 3, 4 are not always disposed at an equal height above the support 2. Additionally, as it often happens, the link-ends are not in co-axial alignment with each other. The bearing-force of the electrodes on the link-ends 3, 4 in the prior art devices is only horizontal, i.e., in the direction of the arrow H of FIG. 3.

The instant invention utilizes another component of force added to the horizontal force H, according to FIG. 3 by applying a vertical force V in which forces V and H combine to provide a resultant force R, applied to the electrodes at about 45° at opposite sides of a link and presses it down onto the support 2.

The electrode head of FIG. 4 comprises two levers or gripping arms 15 and 16 which are connected at one end to the ends of an adjustable shaft 19 by means of ball joints 18. The shaft 19 is adjustable by means of a device shown in FIG. 5, for example, according to the direction of arrow 22, and is also tiltable in the horizontal plane in accordance with the arcuate arrow 300, so that the gripper arms 15, 16, and the electrodes 26, 27 are therewith adjustable in close proximity with the link-ends 3, 4 and simultaneously are oriented in alignment to each other.

Figure 5:
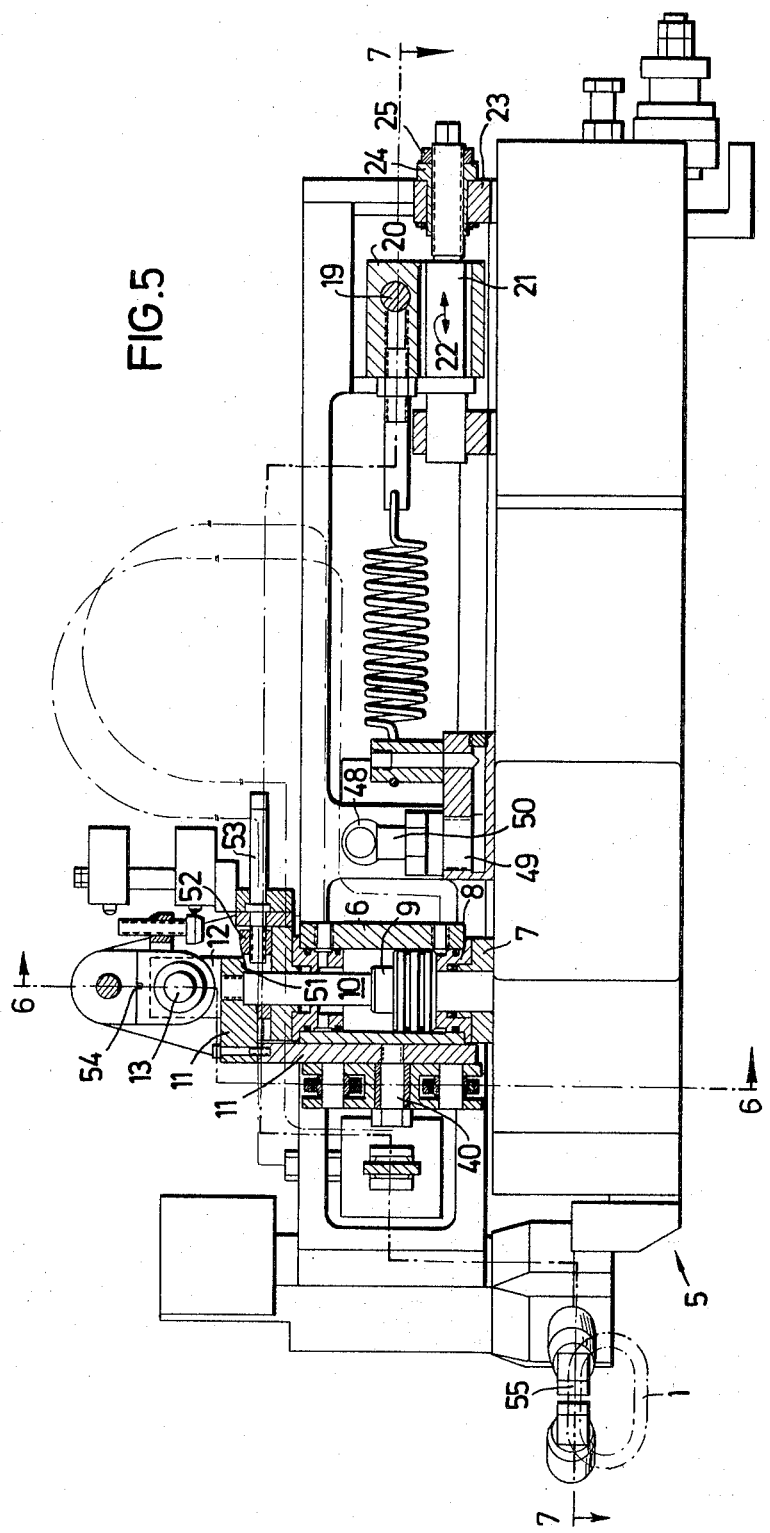
FIG. 5 is a longitudinal cross section of another embodiment of an electrode head according to the instant invention in a more highly developed form.
Figure 6:
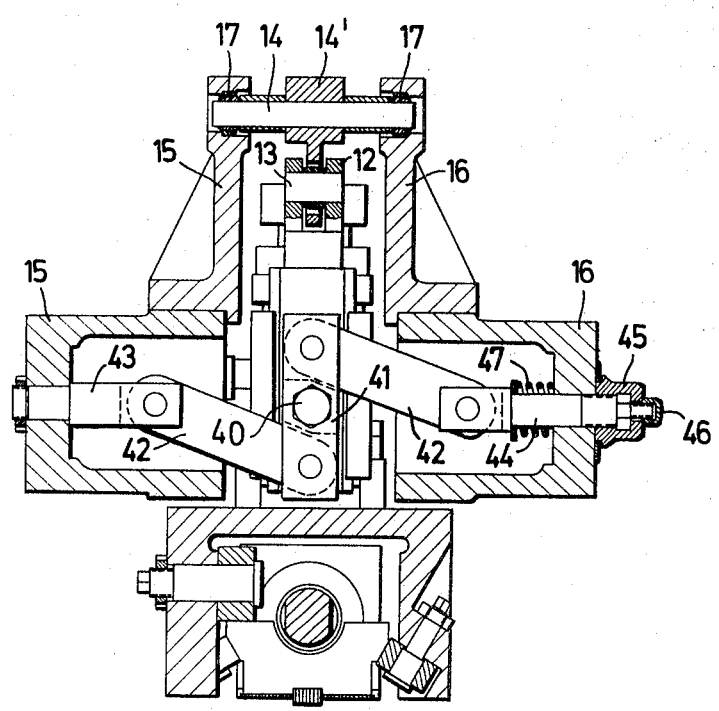
FIG. 6 is a vertical cross section taken substantially on the plane of line 6—6.
Figure 7:
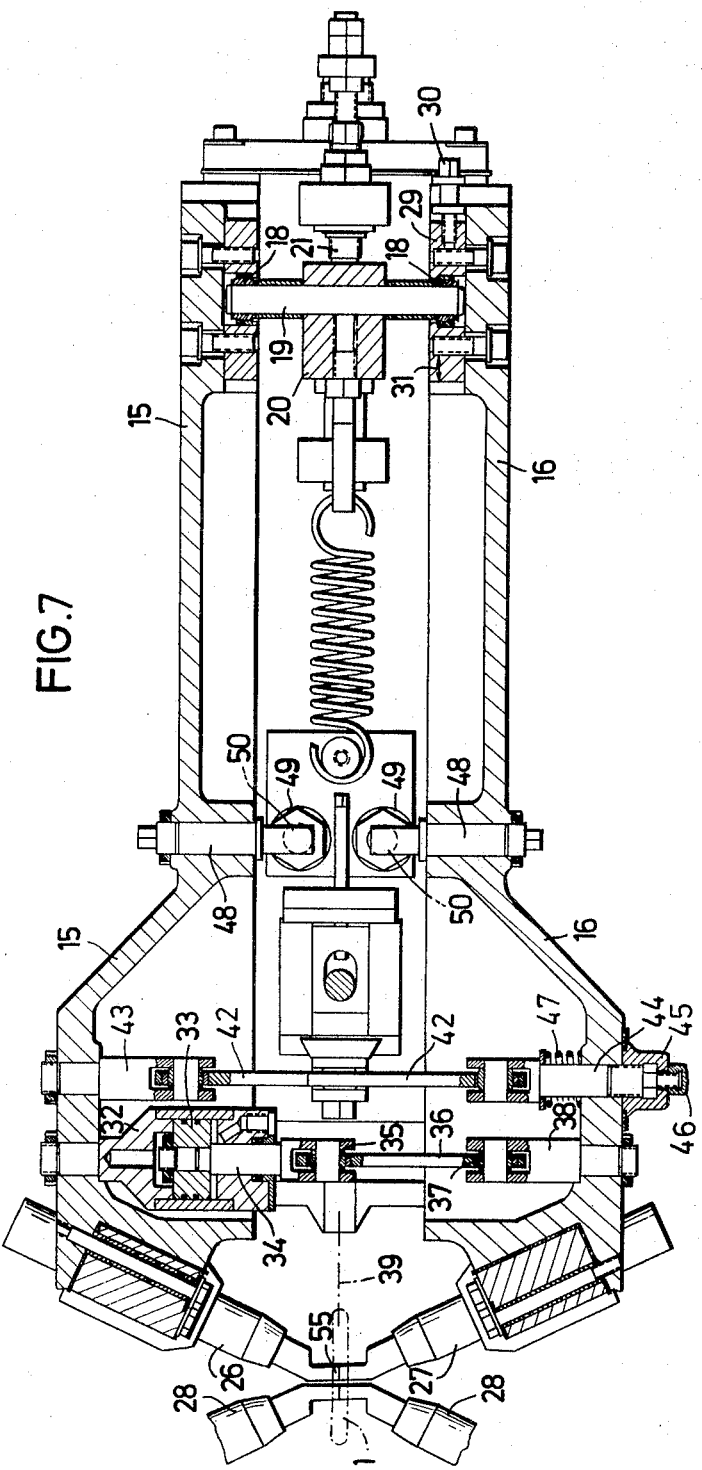
FIG. 7 is a longitudinal, horizontal section on line 7—7 of FIG. 5.

In general, FIG. 4 serves to diagrammatically illustrate the embodiment of the novel electrode head shown in detail in FIGS. 5 to 7.

According to FIGS. 4 to 7, a lifting cylinder 6 is mounted on an upsetting slide 5 (FIG. 5) by means of a cap 7 and intermediate cap 8, of the link-welding apparatus; which, per se, is not the subject of the instant invention, and which is therefore not shown in detail. A lifting piston 9 together with a piston rod 10 is adjustable vertically relative to the upsetting slide 5.

A glide sleeve 11 is fixed to the upper end of piston rod 10 and the sleeve 11 is glidingly and telescopically arranged on the outer wall of cylinder 6. The cylinder 11 is provided with two upwardly projecting spaced plates 12 (see FIG. 6) and connected between the plates 12 is a spindle 13 which carries a rocking lever 14 by means of an intermediate bearing piece 14'; the positioning of the intermediate piece 14' on the spindle 12 is by means of a ball joint bearing. The arms 15, 16 are connected to the ends of the rocking lever 14 by means of ball pivots 17. These gripping arms 15, 16 extend horizontal and according to FIG. 7 are positioned at the end of the adjusting axle 19 by means the ball pivots 18 on said adjusting axle being secured in an adjustment piece is 20. The adjustment piece seated on an adjustment spindle 21, which, according to the double arrow 22, is adjustable by means of a nut 24; secured by means of a counternut 25; accordingly, the nut 25 is secured in a bearing block 23 of the upsetting slide, against axial displacement.

In this manner, it is possible to move the electrodes 26 and 27 which are arranged on the ends of the arms 15, 16, in spaced relation toward the oppositely positioned pairs of electrodes 28. In order to be able to compensate for nonuniformities between the electrodes 26, 27, one of the ball joint bearings 18 of the adjustable axle 19 is adjustable in a longitudinal direction in an adjusting slide 29 by means of a machine or set screw 30 in the direction of a double arrow 31. The adjusting axle 19 is thereby placed in a somewhat canted position; the rocker 14, 14' joins in this movement into a slanted position by means of the ball pivots 17.

As is seen from FIGS. 4 and 7, a rocking cylinder 32 is arranged between the arms 15, 16; said rocking cylinder 32 connecting the two gripping arms by means of piston 33, piston rod 34, ball pivot 35, connecting rod 36, as well as ball pivot 37 and adapter piece 38. The arms 15, 16 and releasing movements made by this cylinder 32 are symmetrically adjusted relative to the center line 39 by means of a center adjustment, which is seen in FIGS. 5 and 6 comprising a bolt 40 (FIG. 5) connected to the sliding sleeve 11; the bolt 40 carrying a link 41 pivotally connected at its ends to transmission-rods 42 which are connected to the gripping arms 15, 16 by means of pieces 43, 44, as well as ball pivots;

see FIG. 6. The interim piece 44 is longitudinally adjustable by means of an adjusting nut 45 and a counternut 40, and is urged into position by means of a spring 47; this arrangement functions to relieve stresses and prevent breakage of the parts.

While the electrodes 26, 27 on one hand are adjustable in the direction along the axis 39, by means of spindle 21, and by means of the adjusting screw 30, they are mutually adjustable in the same direction; the adjustment of height is made by means of the eccentric bolts 48 (FIG. 5) and impact cylinders 49 (FIGS. 4 and 5) which include piston rods 50 reciprocable per the double-direction arrow 50. In the impact or pressure position, the pistons 50 of this cylinder 49 are driven out or vertically and the eccentric 48 is adjusted so that when the gripper arms are lowered, the electrodes 26, 27 are positioned immediately above or on the link 1; while still not yet exerting any pressure. During provision of pressure on the lifting cylinder 6, the impact cylinders 49 are rendered pressureless so that a key bed 51 (FIG. 5) engages on an adjusting bed 52, which is adjustable by means of an adjusting spindle 53, thereby limiting the movement of the lifting piston 9.

OPERATION

From these illustrations is seen that with the lifting movement of each gripper arm 15, 16 there results nearly simultaneous expanding of arms 15, 16, whereby the lifting movement around the ball pivots 18 (FIG. 7) is made at the ends of the adjustment rocker 19 (FIG. 5), while the expanding movement is made around an axis which goes through these ball pivots 18 and the ball pivots 17 which are located at the ends of the rocking lever 14. This expanding axis is lifted by means of the lifting cylinder 6, so that the triangles (see FIG. 4), which result from the contact-keypoints 54 (FIG. 4) of the electrodes on the link-ends as well as the two ball pivots 17 and 18, lift themselves upwardly from a closed position, as shown in top view in FIG. 7, under the effect of the lifting cylinder 6, in the direction of arrows 55 (FIG. 4). However, they also move apart simultaneously under the effect of the cylinder 32 in the direction of the arrows 56. The electrode-tips 57 (FIG. 4) describe therefore, during the lifting movement, a double-spatial circular or compound movement so that this movement coincides with the resultant force R of the pressures from lifting cylinder 6 and cylinder 32. The contact movement of the electrodes thus complies with the direction of this resultant tensional force.

What is claimed is:

1. An electrode head for chain-link welding apparatus comprising, in combination similarly constructed electrode head assemblies, each assembly comprising, in combination, a pair of spaced arms; electrode means mounted at adjacent ends of each of said arms, said electrode means extending toward each other in spaced pairs from respective arms and terminating short of a longitudinal plane passing between the arms of the respective assemblies; means for orienting a chainlink to be welded in a vertical plane generally coinciding with the longitudinal plane between arms; electrodes of the respective assemblies at opposite sides of the longitudinal plane defining current-conducting pairs engagable at opposite sides of adjacent ends of the vertically disposed chain-link being welded; means mounting each of said pairs of arms for relative articulated canting movement relative to the vertical chain-link plane and means for causing the arms and electrodes thereon to move in a compound path of movement comprising both vertical and horizontal components relative to the vertical plane in which the chain-link is vertically disposed; and plural independently-operable power means operatively connected to said arms for effecting the compound movement and simultaneously raising and moving said arms outwardly or alternatively lowering and moving the arms inwardly in bi-directional paths of movement relative to said vertical chain-link plane to respectively disengaging or applying the spaced pairs of electrodes onto adjacent ends of the chain-links being welded in a resultant force direction generally from above the vertically disposed chain-link whereby minor portions of the link are engaged for minimizing wear on the electrode means and maximizing contact of the electrode means with the link being welded.

2. The structure as claimed in claim 1 in which said power means for moving the arms comprises fluid pressure-operated assemblies.

3. The structure as claimed in claim 1 including individual force transmitting means operatively connected between pairs of arms transverse to the vertical chain link plane for lateral movement to the arms and the electrodes on said arms.

4. The structure as claimed in claim 3 including adjusting means operatively connected to said force transmitting means for controlling the amount of force applied to the links being welded.

5. The structure as claimed in claim 4 including resilient means interposed in said adjusting means for relieving excessive forces on said adjusting means and the arms to which said force transmitting means are operatively connected.

6. The structure as claimed in claim 1 in which one of said power means for moving the pairs of said arms includes a link operatively connected to intermediate portions of said pairs of arms.

7. The structure as claimed in claim 1 including centering means operatively connected to said pairs of arms.

8. The structure as claimed in claim 7 in which said centering means comprises a force transmitting assembly operatively connected to said pairs of arms, and a pair of links pivotally connected in spaced relation at inner ends to an intermediate pivot axis on said force transmitting assembly and pivotally connected at outer ends to a respective one of said arms.

9. The structure as claimed in claim 8 in which said pairs of arms include means for adjusting the arms along their longitudinal axis relative to the means for orienting a chain link, said arms being connected at rear end portions by universal joint means whereby the arms have independent articulated movement at said universal joint means.

10. The structure as claimed in claim 9 in which said means for adjusting the pairs of arms comprises a shaft element extending transversely of the plane in which the links are oriented, said universal joint means connecting terminal portions of said shaft to said pairs of arms.

11. The structure as claimed in claim 1 in which said means for mounting said pairs of arms for independent articulated movement comprises universal joint means of each of the assemblies forming a triangular relationship including points passing through rear and intermediate portions of said pairs of arms and terminal end portions of the electrodes whereby said electrodes are applied to a link being welded in an oblique downwardly converging angle above and toward the vertical plane in which said links being welded are disposed.

12. The structure as claimed in claim 11 including guide means reciprocatably supporting said electrode head for movement along the plane in which said links are oriented.

* * * * *